Patented Sept. 3, 1929.

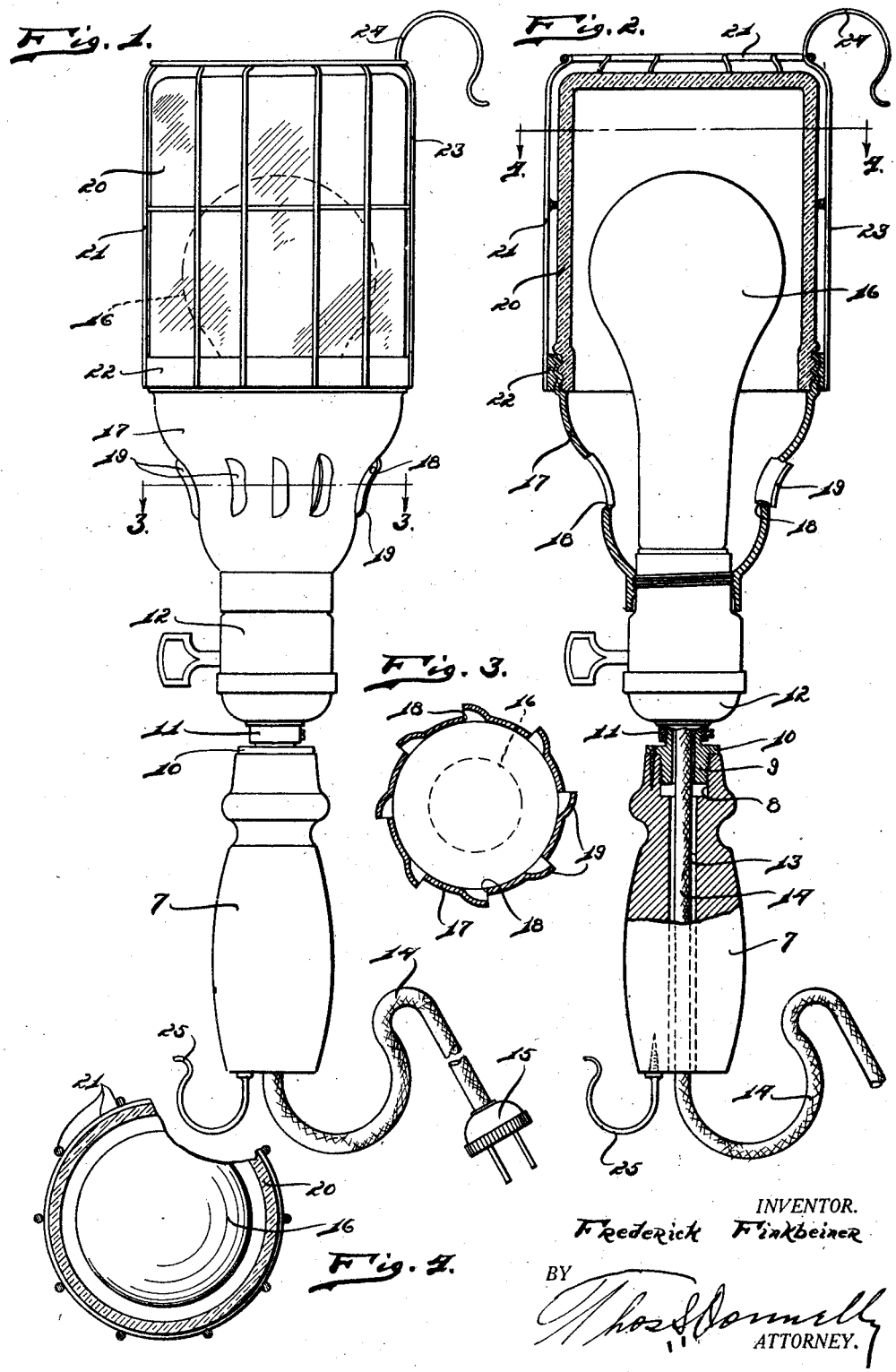

1,726,550

UNITED STATES PATENT OFFICE.

FREDERICK FINKBEINER, OF FERNDALE, MICHIGAN.

TROUBLE WELDING LIGHT.

Application filed May 18, 1928. Serial No. 278,667.

My invention relates to a new and useful improvement in a trouble welding light adapted for use in welding operations for illuminating the piece to be welded. In welding operations as now practised, it is customary to have a light comprising an electric light bulb positioned at a point so that the piece welded lies between the welding apparatus and the light, and generally below it, so that molten pieces of metal frequently come into contact with the light bulb, fracturing it, and thus causing a delay in the welding operation while the fractured light bulb is removed and replaced by a new one.

The present invention has as its object the provision of a light of this class whereby the light bulb will be protected from contact with particles which might fracture it while at the same time, the light necessary for illuminating the piece to be welded may be afforded.

It is another object of the present invention to provide a light of this class having a detachable transparent covering for the light bulb.

It is another object of the present invention to provide a light of this class having a light bulb protected by a transparent covering and provided with openings so that the interior of the covering may be ventilated.

It is another object of the present invention to provide a light of this class whereby a transparent covering may be easily and quickly mounted thereon or replaced by a protective screen which may be easily and quickly placed thereon and removed therefrom.

Another object of the invention is the provision of a device of this class which will be simple in structure, economical of manufacture and highly efficient in use.

Other objects will appear hereinafter.

The invention consists in the combination and arrangement of parts hereinafter described and claimed.

The invention will be best understood by a reference to the accompanying drawings which form a part of this specification and in which, Fig. 1 is a side elevational view of the invention.

Fig. 2 is a view similar to Fig. 1 showing parts in section and parts broken away.

Fig. 3 is a sectional view taken on line 3—3 of Fig. 1.

Fig. 4 is a fragmentary sectional view taken on line 4—4 of Fig. 2.

As illustrated in the drawings I provide a handle 7 which is provided on its upper end with a socket 8 interiorly threaded for threading on the stem 9, which is provided with the peripheral flange 10 and the threaded neck 11, upon which is threaded the socket switch 12, the handle having a passage 13 formed therein for the passage of the cord 14 which carries a plug 15 adapted for inserting into a wall plug to supply electrical energy to the light bulb 16 which is threaded into the socket 12 in the usual manner. Threaded on to the socket 12 is a holder 17 preferably made from metal and provided with a plurality of slits 18, each protected by the outwardly punched shield 19. The upper edge of the holder 17 is interiorly and exteriorly threaded.

When it is desired to cover the bulb 16 with a transparent covering the cup-shaped member 20 which is made from heavy glass or other suitable material and threaded at its open end is threaded into the holder 17, thus affording protection for the light bulb 16, and at the same time, permitting the light rays to emanate therefrom for illuminating purposes.

The light, when constructed in this manner, has proven most efficient in welding operations as the covering 20 is of sufficient thickness to resist breaking when particles of molten material drop thereon.

A wire shield 21 is provided with a ring 22 at one end and adapted for threading on the exterior of the holder 17, this wire shield 21 being in the form of a screen and serving as protection for the covering 20. If desired, this wire shield may be used by itself when the covering 20 is removed from about the bulb 16. One of the wires 23 of the wire covering is extended and doubled upon itself to form a hook 24 whereby the device may be hung. The hook 25 is also secured to the lower end of the handle 7.

In this way I have provided a light which is especially adapted for use in welding operations and which will prove effective under ordinary conditions and result in considerable saving in time as the removal and replacement of the bulb 16 is obviated because of the protection afforded it.

While I have illustrated and described the preferred form of my invention, I do not wish to limit myself to the precise details of structure shown, but desire to avail myself of such variations and modifications as come within the scope of the appended claims.

Having thus described my invention what I claim as new and desire to secure by Letters Patent is:

1. A device of the class described, comprising: a handle having a central passage formed therein communicating with a socket formed in one end thereof, said socket being interiorly threaded; a stem threaded into said socket; a peripheral flange on said stem engaging one end of said handle; a neck projecting outwardly from said flange and peripherally threaded; a switch socket threaded on said neck; a light bulb mounted in said switch socket; a metallic cup-shaped holder threaded on said switch socket and having its open end threaded interiorly and exteriorly; a transparent covering threaded interiorly of the open end of said holder; a wire shield; an interiorly threaded ring on said wire shield threaded on to the exterior of said holder and embracing said transparent covering.

2. A device of the class described, comprising: a handle having a central passage formed therein communicating with a socket formed in one end thereof, said socket being interiorly threaded; a stem threaded into said socket; a peripheral flange on said stem engaging one end of said handle; a neck projecting outwardly from said flange and peripherally threaded; a switch socket threaded on said neck; a light bulb mounted in said switch socket; a metallic cup-shaped holder threaded on said switch socket and having its open end threaded interiorly and exteriorly; a transparent covering threaded interiorly of the open end of said holder; a wire shield; an interiorly threaded ring on said wire shield threaded on to the exterior of said holder and embracing said transparent covering; and elongated shields punched from said holder and extending outwardly of slits formed therein.

3. A device of the class described comprising: a handle having a central passage formed therein communicating with a socket in one end thereof; a stem threaded into said socket having a central opening formed therein registering with the passage in said handle, the outwardly projecting end of said stem being peripherally threaded; a switch socket threaded on said neck; a light bulb mounted in said switch socket; a metallic cup-shaped holder threaded on said switch socket and having its open end threaded interiorly and exteriorly; a transparent covering threaded interiorly of the open end of said holder; a wire shield; and an interiorly threaded ring on said shield threaded onto the exterior of said holder and embracing said transparent covering.

In testimony whereof I have signed the foregoing specification.

FREDERICK FINKBEINER.